(12) United States Patent
Ogawa et al.

(10) Patent No.: US 6,190,114 B1
(45) Date of Patent: Feb. 20, 2001

(54) TRANSFER ROBOT

(75) Inventors: Hironori Ogawa, Osaka; Masashi Kamitani, Ibaraki, both of (JP)

(73) Assignee: Daihen Corporation, Osaka (JP)

( * ) Notice: Under 35 U.S.C. 154(b), the term of this patent shall be extended for 0 days.

(21) Appl. No.: 09/321,371

(22) Filed: May 27, 1999

(30) Foreign Application Priority Data

May 29, 1998 (JP) .................................................. 10-166145

(51) Int. Cl.[7] .................................................. B25J 18/00
(52) U.S. Cl. .................. 414/744.5; 74/490.01; 414/917
(58) Field of Search .............................. 414/744.5, 917; 901/15; 74/479.01

(56) References Cited

U.S. PATENT DOCUMENTS

| 5,083,896 | 1/1992 | Uehara et al. . |
|---|---|---|
| 5,151,008 | 9/1992 | Ishida et al. . |
| 5,333,986 | 8/1994 | Mizukami et al. . |
| 5,421,695 | 6/1995 | Kimura . |
| 5,439,547 | 8/1995 | Kumagai . |
| 5,584,647 | 12/1996 | Uehara et al. . |
| 5,636,963 | 6/1997 | Haraguchi et al. . |
| 5,647,724 | 7/1997 | Davis, Jr. et al. . |
| 5,667,354 | 9/1997 | Nakazawa . |
| 5,713,717 | 2/1998 | Cho . |
| 5,732,352 | 3/1998 | Tanaka . |
| 5,765,444 | 6/1998 | Bacchi et al. . |
| 5,813,823 | 9/1998 | Hofmeister . |
| 5,950,495 | * 9/1999 | Ogawa et al. ................ 414/744.5 X |

FOREIGN PATENT DOCUMENTS

| 7-142552 | 6/1995 | (JP) . |
|---|---|---|
| 8-71965 | 3/1996 | (JP) . |

* cited by examiner

Primary Examiner—Donald W. Underwood
(74) Attorney, Agent, or Firm—Merchant & Gould P.C.

(57) ABSTRACT

A transfer robot includes a first pantograph assembly, a second pantograph assembly, a handling member carried by the second pantograph assembly, a rotation-transmitting mechanism for associating the first pantograph assembly with the second pantograph assembly, a stationary base member, a first shaft and a second shaft which are rotatable about a vertical axis. The transfer robot also includes first and second driving devices associated with the first shaft and the second shaft, respectively. The second pantograph assembly is offset toward the vertical axis relative to the first pantograph assembly.

3 Claims, 15 Drawing Sheets

TRANSFER ROBOT

BACKGROUND OF THE INVENTION

1. Field of the Invention

The present invention relates to a transfer robot used for semiconductor manufacturing equipment, liquid crystal display processing equipment and the like. More particularly, the present invention relates to a transfer robot for transferring workpieces between processing chambers under a vacuum.

2. Description of the Related Art

Conventionally, use has been made of various kinds of transfer robots designed for semiconductor manufacturing equipment, liquid crystal display processing equipment and the like. FIGS. 15–17 of the accompanying drawings illustrate an example of a conventional transfer robot.

AS shown in FIG. 17, the conventional transfer robot is provided with a handling member 84. Though not illustrated, an object to be processed (called "workpiece" hereinafter), such as a silicon wafer, is placed on the handling member 84. The handling member 84, which is carried by an arm mechanism, is arranged to move horizontally in a straight line as well as to rotate in a horizontal plane around a central axis $P_1$. A plurality of processing chambers 71–76 for performing predetermined processing are disposed around the central axis $P_1$. With the use of the transfer robot, the workpiece is automatically brought to and taken away from a selected one of the processing chambers 71–76.

Referring to FIG. 15, the conventional transfer robot includes a rotatable base 81 and a first arm 82. The rotatable base 81 is caused to rotate about a first axis $P_1$ by a driving motor, while the first arm 82 is caused to rotate about the first axis $P_1$ by another driving motor which is fixed to the rotatable base 81.

In FIG. 15, reference number 83 refers to a second arm which is rotatable about a second axis $Q_1$ relative to the first arm 82, while reference numeral 84 refers to a handling member which is rotatable about a third axis $R_1$ relative to the second arm 83.

Reference numeral 85 refers to a first rotation-transmitting member which is fixed to the rotatable base 81 coaxially with the first axis $P_1$, while reference numeral 86 refers to a second rotation-transmitting member which is fixed to the second arm 83 coaxially with the second axis $Q_1$. Reference numeral 87 refers to a third rotation-transmitting member fixed to the first arm 82 coaxially with the second axis Q1, while reference numeral 88 refers to a fourth rotation-transmitting member fixed to the handling member 84 coaxially with the third axis R1.

A first connecting member 89 is provided between the first rotation-transmitting member 85 and the second rotation-transmitting member 86. Also, a second connecting member 90 is provided between the third rotation-transmitting member 87 and the fourth rotation-transmitting member 88. The distance S between the first and second axes $P_1$, $Q_1$ is equal to the distance between the second and third axes $Q_1$, $R_1$. The radius ratio of the first rotation-transmitting member 85 to the second rotation-transmitting member 86 is 2 to 1. The radius ratio of the fourth rotation-transmitting member 88 to the third rotation-transmitting member 87 is also 2 to 1.

Chain sprockets or pulleys may be used for the first to fourth rotation-transmitting members 85–88. Correspondingly, the first and second connecting members 89, 90 may be chains or timing belts.

Reference will now be made to the operation of the arm mechanism of the conventional transfer robot.

At the outset, it is assumed that the rotatable base 81 is kept stationary, and that the first, second and third axes $P_1$, $Q_1$, $R_1$ are initially located in a common straight line, as shown in FIG. 16. Starting from this state, the first arm 82 is rotated counterclockwise through an angle θ about the first axis P1.

During the above operation, the first rotation-transmitting member 85 is fixed in position, while the second axis $Q_1$ is moved counterclockwise around the first axis $P_1$ through the angle θ. (Thus, the second axis $Q_1$ is shifted from the initial position to a new position $Q_{11}$.) As a result, a $Y_1$-side portion of the first connecting member 89 is wound around the first rotation-transmitting member 85, whereas a $Y_2$-side portion of the same connecting member is unwound from the first rotation-transmitting member 85. Thus, as shown in FIG. 16, the first connecting member 89 is moved in a direction indicated by arrows $a_1$ and $a_2$. As a result, the second rotation-transmitting member 86 is rotated clockwise about the second axis $Q_1$.

As mentioned above, the radius ratio of the first rotation-transmitting member 85 to the second rotation-transmitting member 86 is 2 to 1. Thus, when the first arm 82 is rotated counterclockwise about the first axis $P_1$ through the angle θ, the second rotation-transmitting member 86 is rotated clockwise about the second axis $Q_{11}$ through an angle 2θ.

At this time, since the second rotation-transmitting member 86 is fixed to the second arm 83, the second rotation-transmitting member 86 and the second arm 83 are rotated clockwise about the second axis $Q_1$ through an angle 2θ.

If the second arm 83 did not change its orientation relative to the first arm 82, the third axis $R_1$ would be brought to an $R_{11}$ position shown by broken lines. Actually, however, the second rotation-transmitting member 86 is rotated clockwise about the second axis $Q_{11}$ through an angle 2θ. Therefore, the third axis $R_{11}$ is moved clockwise about the second axis $Q_{11}$ through the same angle 2θ to be brought to the $R_{12}$ position. This means that the third axis third axes $P_1$ and $R_1$ even while the first arm 82 is being rotated counterclockwise about the first axis $P_1$ through an angle θ.

When the second arm 83 is rotated clockwise about the second axis $Q_{11}$ through an angle 2θ, thereby bringing the third axis $R_{11}$ to the $R_{12}$ position, a $Y_2$-side portion of the second connecting member 90 is wound around the third rotation-transmitting member 87, whereas a $Y_1$-side portion of the same connecting member is unwound from the third rotation-transmitting member 87.

As a result, the second connecting member 90 will be shifted in a direction $b_1$–$b_2$ shown in FIG. 16. Thus, the fourth rotation-transmitting member 88 is rotated counterclockwise about the third axis $R_{12}$.

When the second arm 83 is rotated clockwise about the second axis $Q_{11}$ through an angle 2θ as stated above, the fourth rotation-transmitting member 88 is rotated counterclockwise about the third axis $R_{12}$ through an angle θ (since the radius ratio of the fourth rotation-transmitting member 88 to the third rotation-transmitting member 87 is 2 to 1). As a result, a point $C_0$ of the fourth rotation-transmitting member 88 is brought to a position $C_1$ on the straight line passing through the first and the third axes $P_1$, $R_{12}$.

Upon rotation of the first arm 82 about the first axis P1 in the counterclockwise direction as described above, the handling member 84 is moved along the line passing through the first and the third axes $P_1$, $R_1$. During this operation, the handling member 84 does not changed its attitude or orientation since it is fixed to the fourth rotation-transmitting member 88.

The transfer robot having the above-described arrangement is installed at the center of the processing chambers 71–76, as shown in FIG. 17. Workpieces are transferred by the transfer robot between these chambers 71–76.

Though useful in many respects, the conventional transfer robot has been found disadvantageous in the following points.

First, as shown in FIG. 15, the second arm 83 incorporates the fourth rotation-transmitting member 88 and the second connecting member 90. In this arrangement, the second arm 83 is rendered to have an unduly great thickness $H_1$.

Second, since the non-illustrated driving motor for actuating the arm mechanism is mounted on the rotatable base 81, the motor is rotated together with the base 81 around the axis $P_1$. In the conventional transfer robot, use is made of a power supply cable for connecting the driving motor to an external power source. Thus, when the driving motor is moved around the central axis $P_1$, the power supply cable may be wound about a shaft. Clearly, when the cable has been wound on the shaft too many times and yet the driving motor continues to be moved around the central axis $P_1$, the cable may be damaged (snapped at worst).

In order to avoid such a problem, the rotation of the base 81 should be stopped before the rotation angle of the base 81 goes beyond a predetermined limit (540° for example). However, for controlling the rotation of the rotatable base 81, additional devices such as a monitor and a rotation controlling unit may be needed. Disadvantageously, such additional devices will render the transfer robot unduly expensive. Besides, the restriction of the rotation angle of the base 81 tends to make the conventional transfer robot less usable.

SUMMARY OF THE INVENTION

It is, therefore, an object of the present invention to provide a compact, inexpensive transfer robot which is easy to operate and capable of providing good productivity.

According to the present invention, there is provided a transfer robot comprising:

a double pantograph mechanism including a first pantograph assembly and a second pantograph assembly, the first pantograph assembly being made up of a base link, an outer link and a pair of first intermediate links connecting the base link to the outer link, the second pantograph assembly being made up of the outer link, an inner link and a pair of second intermediate links connecting the outer link to the inner link;

a first handling member for holding a workpiece, the first handling member being supported by the inner link;

a rotation-transmitting mechanism for associating the first pantograph assembly with the second pantograph assembly;

a stationary base member;

a first shaft and a second shaft which are rotatable about a vertical axis, each of the first and the second shafts being coaxially supported by the base member; and a first driving device and a second driving device associated with the first shaft and the second shaft, respectively, each of the first and the second driving devices being attached to the base member;

wherein one of the first intermediate links is attached to the first shaft, the base link being attached to the second shaft, each of the first and the second intermediate links being identical in length, the second pantograph assembly being offset toward the vertical axis relative to the first pantograph assembly, the first handling member being arranged not only to linearly move in horizontal straight lines passing through the vertical axis but to move around the vertical axis.

According to a preferred embodiment, the transfer robot may further comprise an additional handling member supported by the inner link. In such an instance, the first handling member and the additional handling member may be arranged to project from the inner link in the opposite directions.

Preferably, each of the first and the second shafts may be rotatably supported via a magnetic fluid seal for hermetic sealing.

Other objects, features and advantages of the present invention will become clearer from the following detailed description given with reference to the accompanying drawings.

DETAILED DESCRIPTION OF THE PREFERRED EMBODIMENTS

The preferred embodiments of the present invention will be described below with reference to the accompanying drawings.

Figure 4:
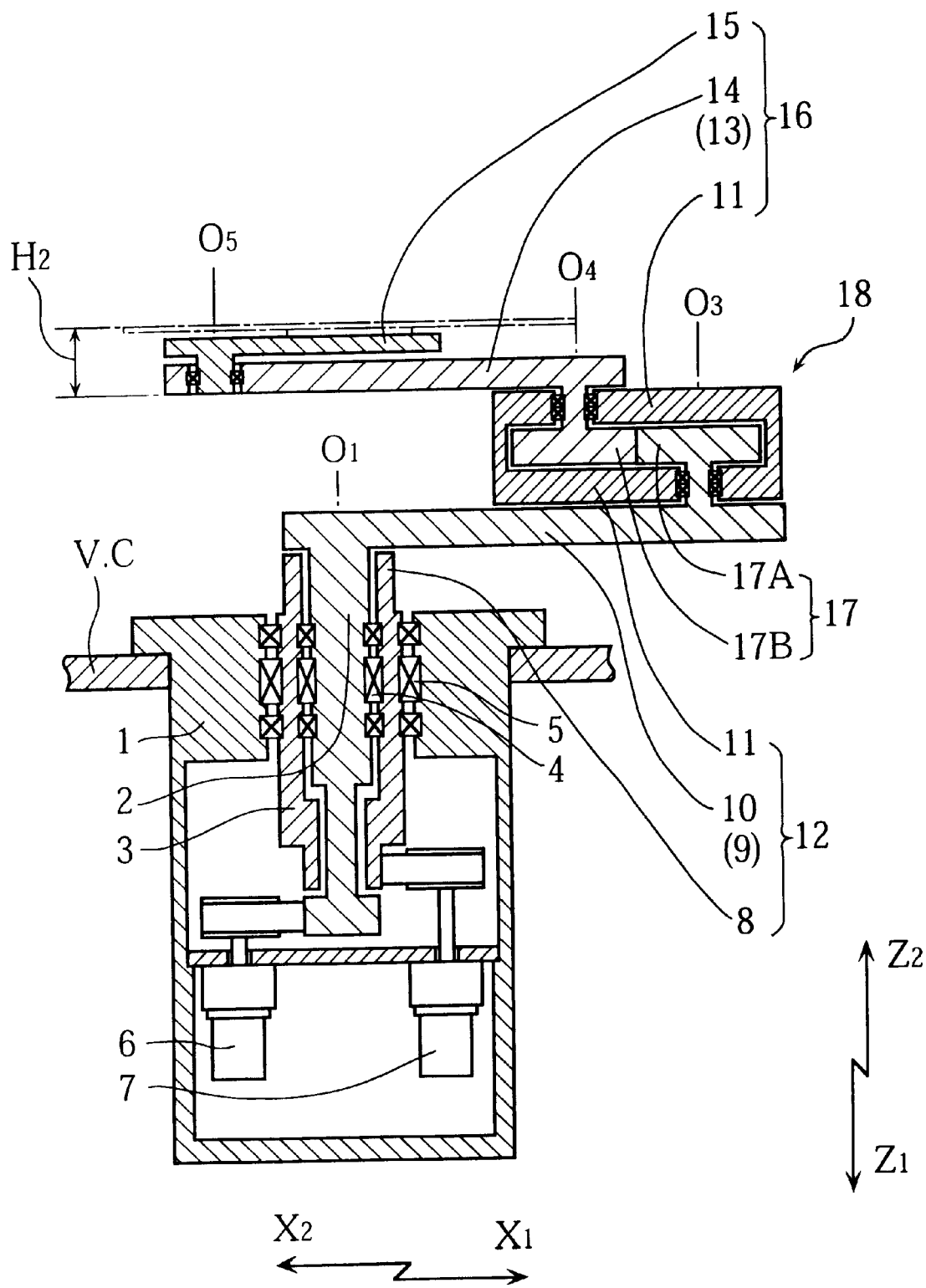
FIG. 4 is a sectional view taken along lines IV—IV in FIG. 2.
Figure 5:
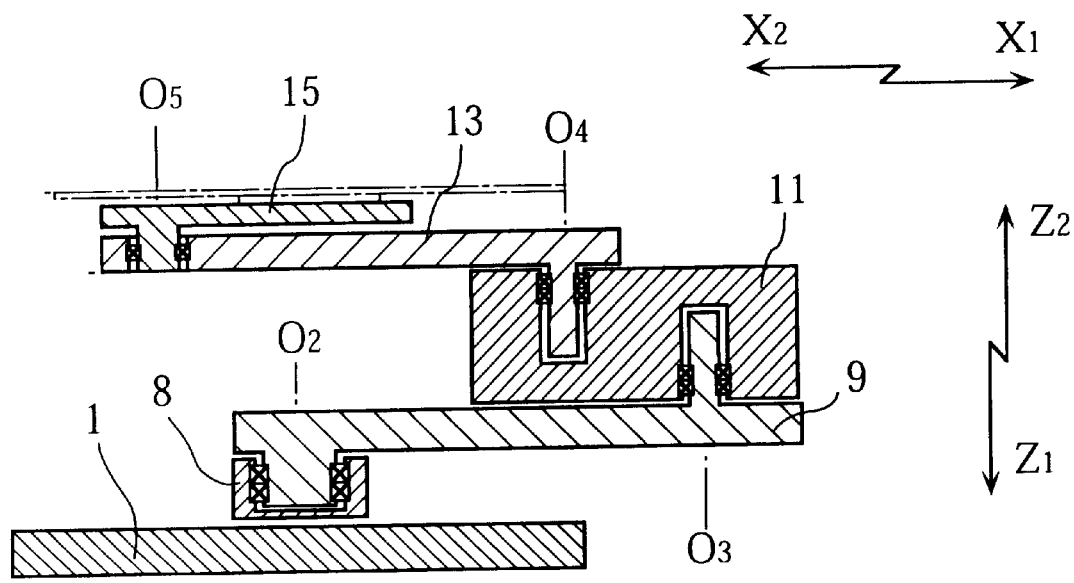
FIG. 5 is a sectional view taken along lines V—V in FIG. 2.
Figure 6:
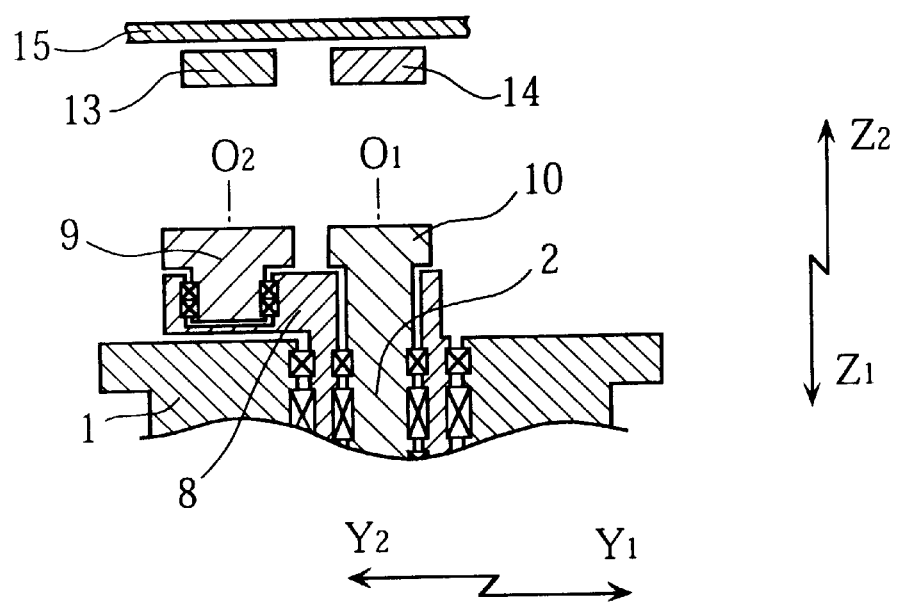
FIG. 6 is a sectional view taken along lines VI—VI in FIG. 2.

Reference is first made to FIGS. 1A–12 which show a transfer robot according to a first embodiment of the present invention. As shown in FIG. 4, the transfer robot of this embodiment includes a stationary base member 1, a first shaft 2 and a second shaft 3. The shafts 2, 3, which are supported by the base member 1 via a suitable number of bearings, are arranged to coaxially rotate about a vertically extending first axis O1. The base member 1 may be installed in a vacuum chamber V.C. For maintaining the vacuum condition in the vacuum chamber, magnetic fluid seals 4, 5 are fitted on the first and the second shafts 2, 3, respectively.

The illustrated robot also includes a first and a second driving devices 6, 7 for actuation of the shafts 2 and 3, respectively. Each of the driving devices 6, 7 is associated with a corresponding one of the shafts 2, 3 via a suitable speed reducer, a rotation-transmitting member such as a sprocket or a pulley, and a connecting member such as a chain or a timing belt.

Figure 1A:
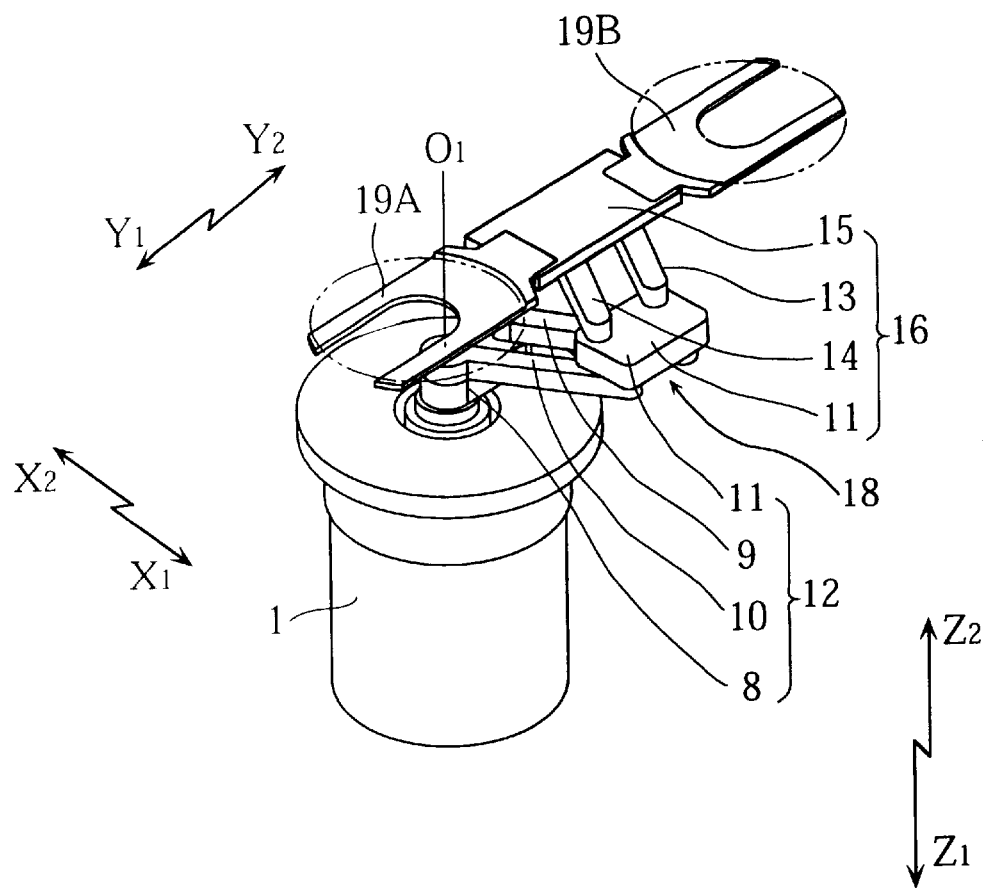
FIGS. 1A and 1B are perspective views showing a transfer robot according to a preferred embodiment of the present invention.
Figure 2:
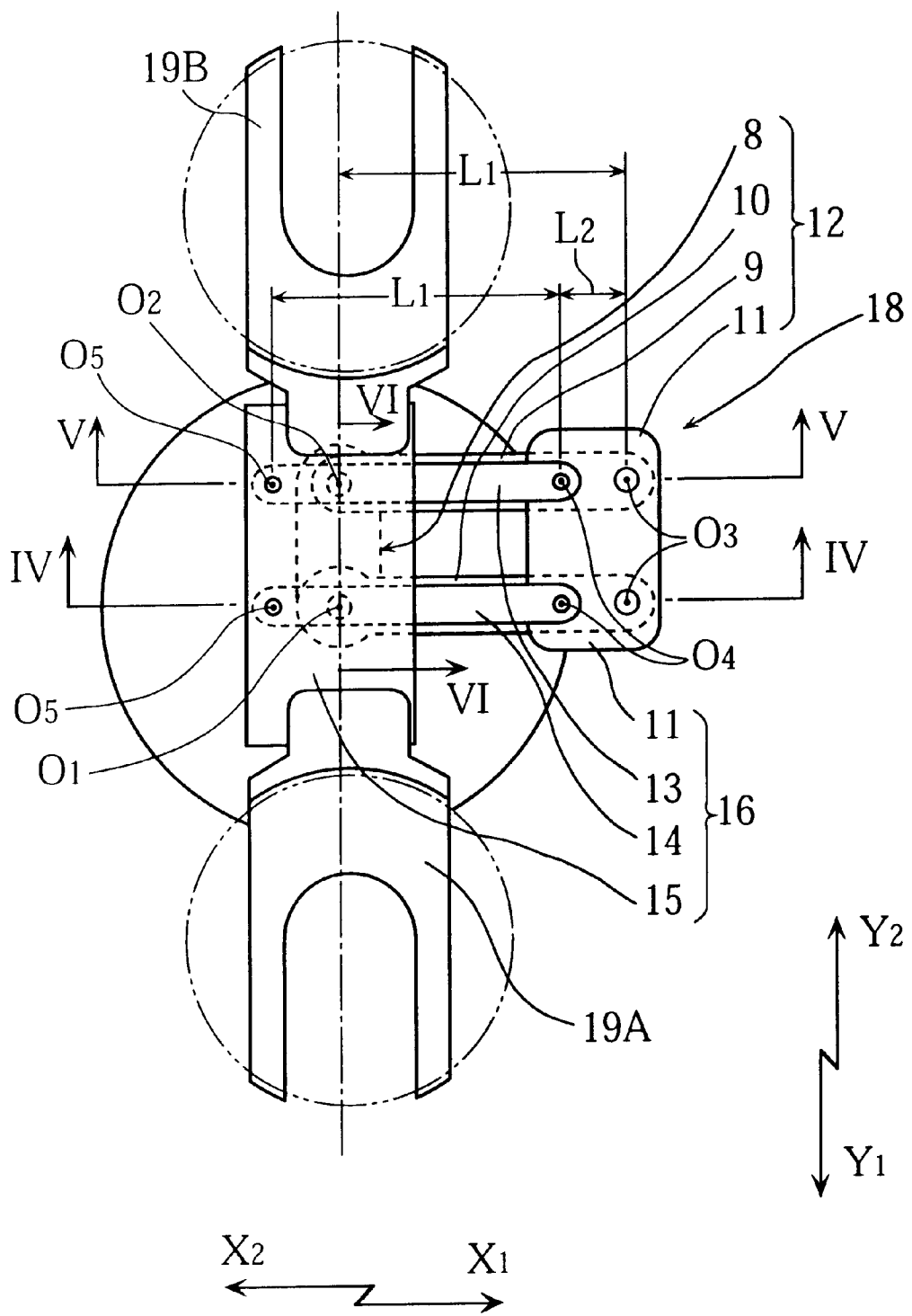
FIG. 2 is a plan view showing the transfer robot of the first embodiment with its arm mechanism held in a rotatable position.
Figure 3:
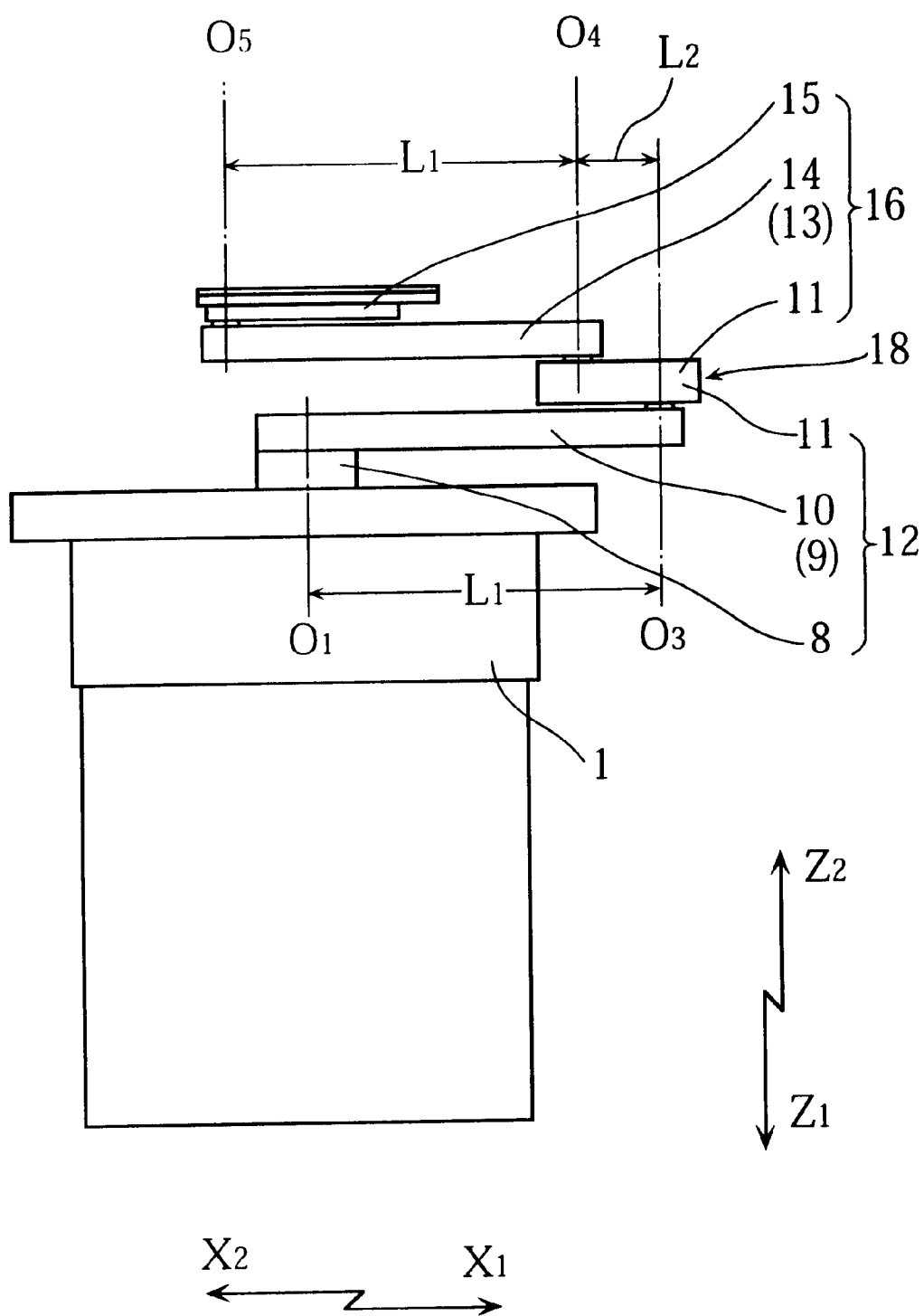
FIG. 3 is a front view showing the transfer robot of the first embodiment.

As shown in FIGS. 1A and 2, the transfer robot further includes a base link 8, a pair of first intermediate links 9, 10, an outer link 11, a pair of second intermediate links 13, 14, and an inner link 15. The base link 8 is connected to the second shaft 3 (see also FIG. 4). The first intermediate link 9 is connected to the base link 8, so that the former is pivotable with respect to the latter about a second axis O2. The other first intermediate link 10 is fixed to the first shaft 2 (FIG. 4). The outer link 11 is connected to the base link 8 via the first intermediate links 9, 10. The first intermediate links 9, 10 are pivotable with respect to the outer link 11 about third axes O3.

The above-mentioned base link 8, first intermediate links 9, 10 and the outer link 11 constitute a first pantograph assembly 12. Similarly, the outer link 11, second intermediate links 13, 14 and the inner link 15 constitute a second pantograph assembly 16. The second intermediate links 13, 14 are pivotable, at one end thereof, with respect to the outer link 11 about fourth axes O4. Further, the second intermediate links 13, 14 are pivotable, at the other end thereof, with respect to the inner link 15.

The first and the second intermediate links 9–10, 13–14 have the same length L1. As viewed from above (FIG. 2), a straight line connecting the third axes O3 is offset outwardly (in the X1-direction in FIG. 2) by a distance L2 from a straight line connecting the fourth axes O4. Thus, the second pantograph assembly 16 is offset from the first pantograph assembly 12 toward the first axis O1. In such an arrangement, the fifth axes O5 are offset from the first axis O1 in the X2-direction.

Referring to FIG. 4, a rotation-transmitting assembly 17 is provided which includes a first gear 17A fixed to the first intermediate link 10 and a second gear 17B fixed to the second intermediate link 14. The first and the second gears 17A, 17B are held in engagement with each other.

In the illustrated embodiment, the first shaft 2, the first driving device 6, and the first and the second pantograph assemblies 12, 16 constitute a double pantograph mechanism 18.

As shown in FIG. 2, the inner link 15 carries two handling members 19A, 19B attached thereto for holding workpieces. As illustrated, the handling members 19A, 19B are oppositely directed. As will be described later, these handling members, in operation, are moved along a horizontal straight line passing through the first and the second axes O1, O2 (hereinafter, this line may be referred to as "O1–O2 line"), while also being moved in circles around the first axes O1.

Description will now be made of the workings of the double pantograph mechanism 18.

Figure 7:
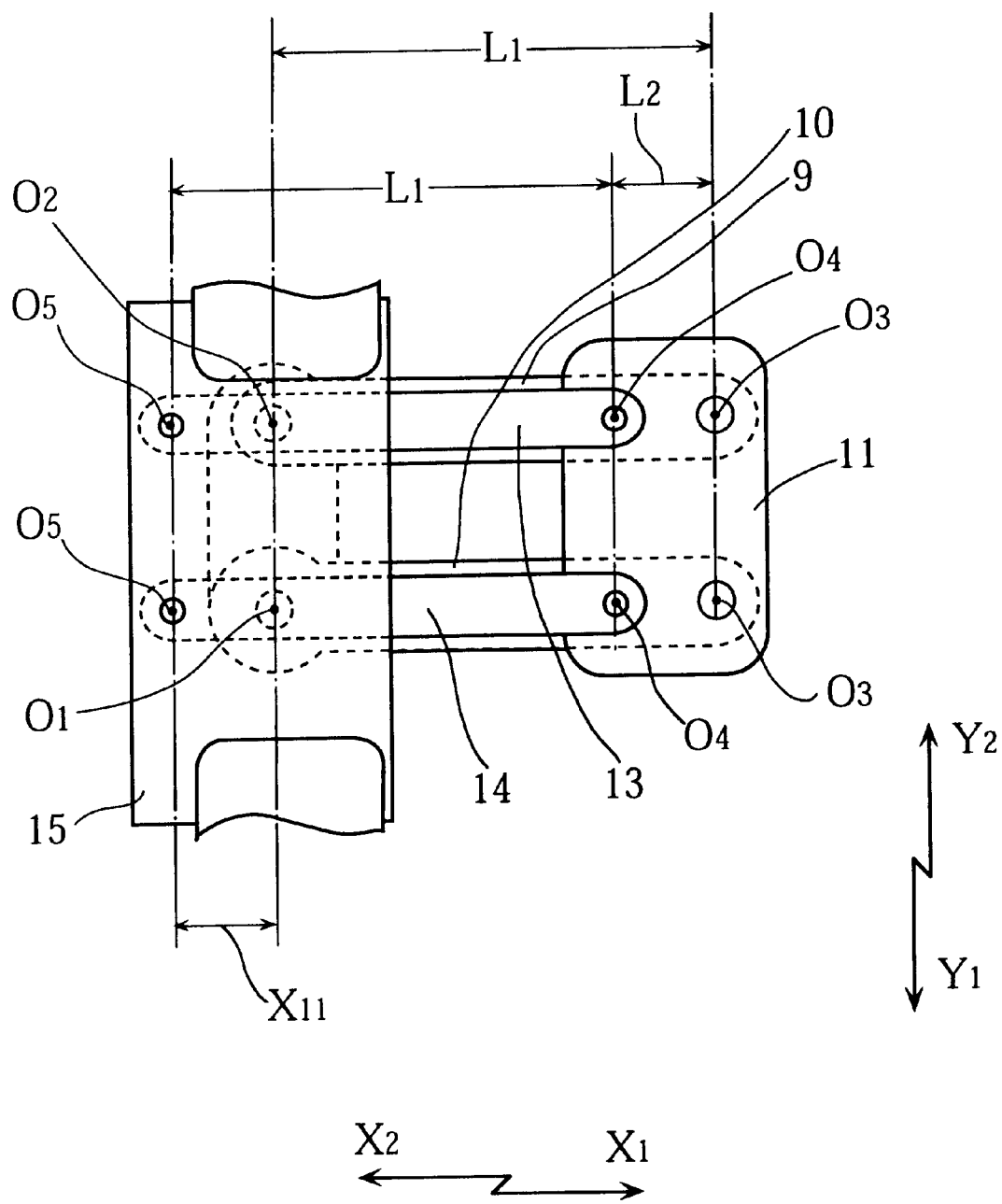
FIGS. 7 and 8 are plan views illustrating how the arm mechanism of the transfer robot is operated.
Figure 8:
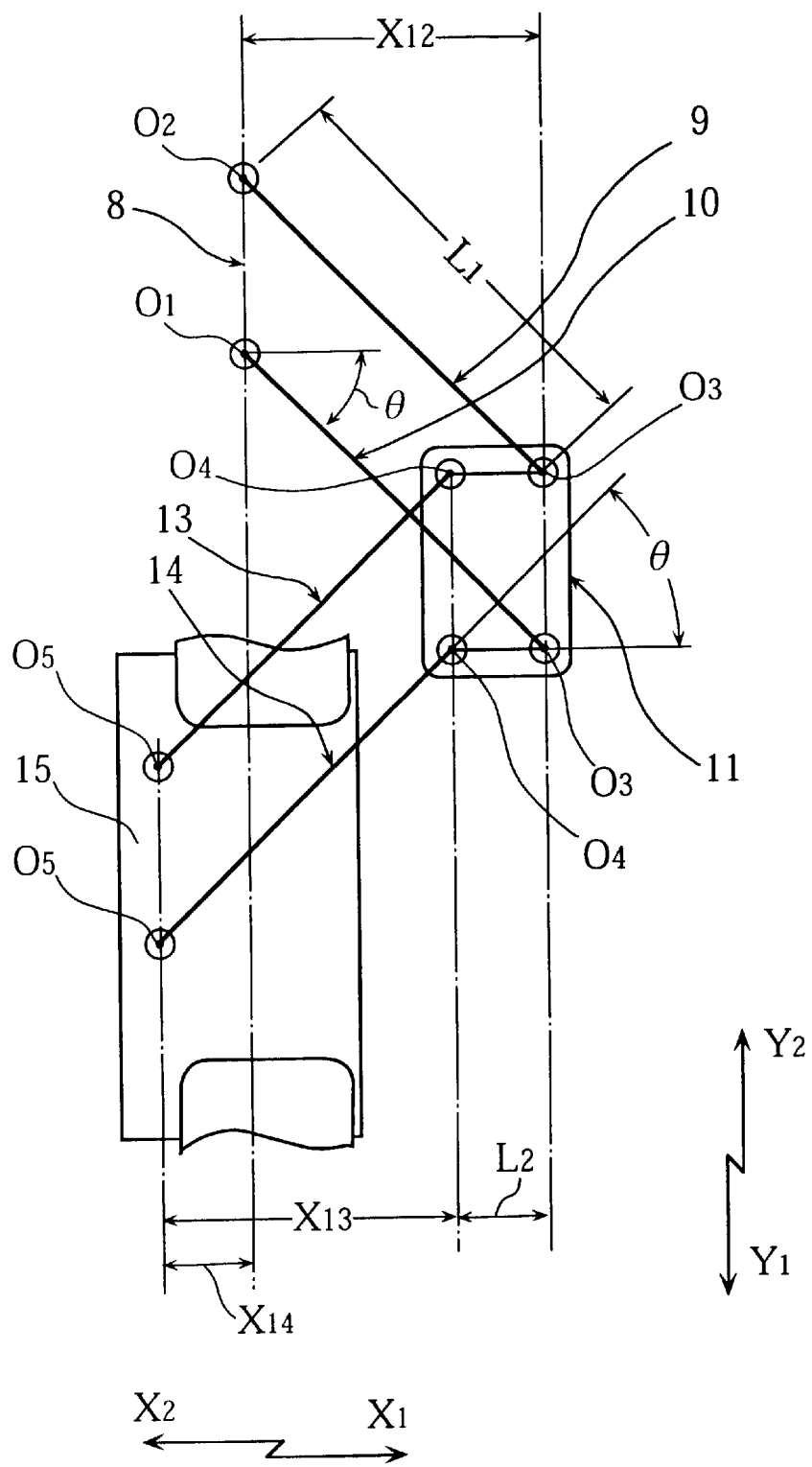

When the first driving device 6 is actuated, the first shaft 2 (and hence the first intermediate link 10) is rotated clockwise about the first axis O1 through an angle θ, as shown in FIG. 8. As a result, the first pantograph assembly 12 is moved in the Y1-direction, from the position shown in FIG. 7 to the position shown in FIG. 8. During this movement, the positions of the first and the second axes O1, O2 are not altered.

When the first intermediate link 10 is rotated clockwise through the angle θ about the first axes O1, the same link is also rotated clockwise through the same angle θ about the third axes O3. As a result, the second intermediate link 14 is rotated counterclockwise about the fourth axes O4 through the angle θ via the rotation-transmitting assembly 17. As a result, the second pantograph assembly 16 is shifted in the Y1-direction relative to the outer link 11 (see FIG. 8).

Referring now to FIG. 7, each of the first and the second intermediate links 9, 10, 13, 14 has the common length L1, as previously mentioned. Supposing that the third and the fourth axes O3, O4 are spaced from each other by a predetermined distance L2, the distance between the first and the fifth axes O1, O5 is equal to L2.

In FIG. 8, it is assumed that, as viewed in the X-direction, the distance between the first axes O1 (or the second axes O2) and the third axes O3 is X12. Similarly, the distance between the fourth axes O4 and the fifth axes O5 is X13, while the distance between the first axes O1 (or the second axes O2) and the fifth axis O5 is X14. In such a case, the following equations hold:

$$X12+X14=X13+L2,$$

$$X12=L1 \cos \theta,$$

and $$X13=L1 \cos \theta.$$

From these relations, it is known that X14=L2. Further, since X11 is equal to L2 (FIG. 7), the relation X11=X14 results. This means that, when the first intermediate link 10 is rotated, clockwise or counterclockwise, about the first axes O1, the inner link 15 is moved along the same straight line passing through the two fifth axes O5. In this movement, the inner link 15 maintains its initial orientation.

Referring to FIG. 2, the handling members 19A and 19B are mounted on the inner link 15 in a manner such that their central line extending in the Y-direction coincides with the O1-O2 line. Thus, when the inner link 15 is caused to reciprocate in the Y-direction, workpieces placed on the handling members 19A, 19B is moved in the Y-direction in a manner such that the centers of the handling members 19A, 19B are always kept in the O1-O2 line.

Figure 1B:
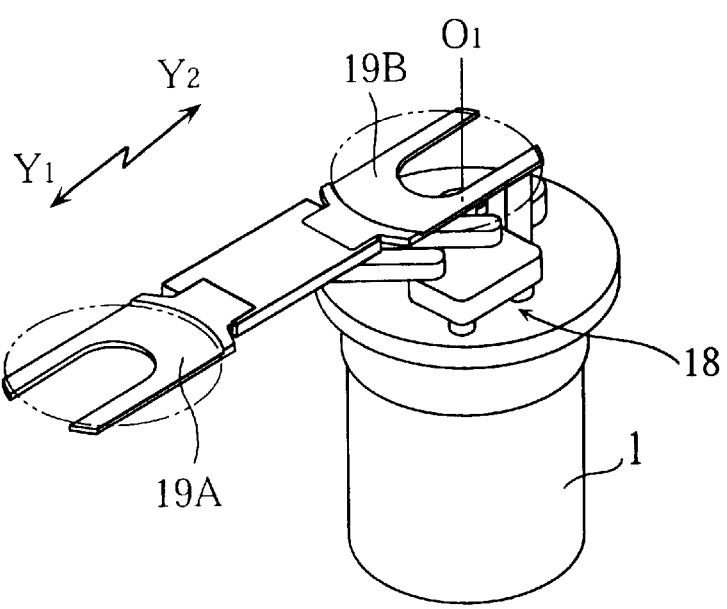

When the double pantograph mechanism 18 is actuated, the handling members 19A, 19B are moved in the Y2-direction (FIG. 1A) or in the Y1-direction (FIG. 1B). While one of the handling members 19A, 19B is being jutted out radially of the base member 1, a workpiece will be put on or taken away from the selected one of the handling members 19A, 19B.

After the workpiece is properly shifted onto or away from the handling member, the double pantograph mechanism 18 is actuated to bring the currently jutted-out handling member back to the initial position as shown in FIG. 2. In this initial position, the handling members 19A and 19B are moved around the first axes O1.

Specifically, when the handling members 19A and 19B are held in the initial position as shown in FIG. 2, the first and the second driving devices 6, 7 (FIG. 4) are actuated simultaneously in synchronism with each other, so that the first and the second shafts 2, 3 are rotated at the same rate in the same direction (clockwise or counterclockwise). As a result, all components fixed to the first shaft or the second shaft are rotated, as a whole, about the first shaft O1. After the handling members 19A and 19B have been rotated through a required angle in the above manner, the handling member 19A or 19B is jutted outwardly (see FIGS. 1A, 1B) for performing the shifting of a workpiece.

Figure 9:
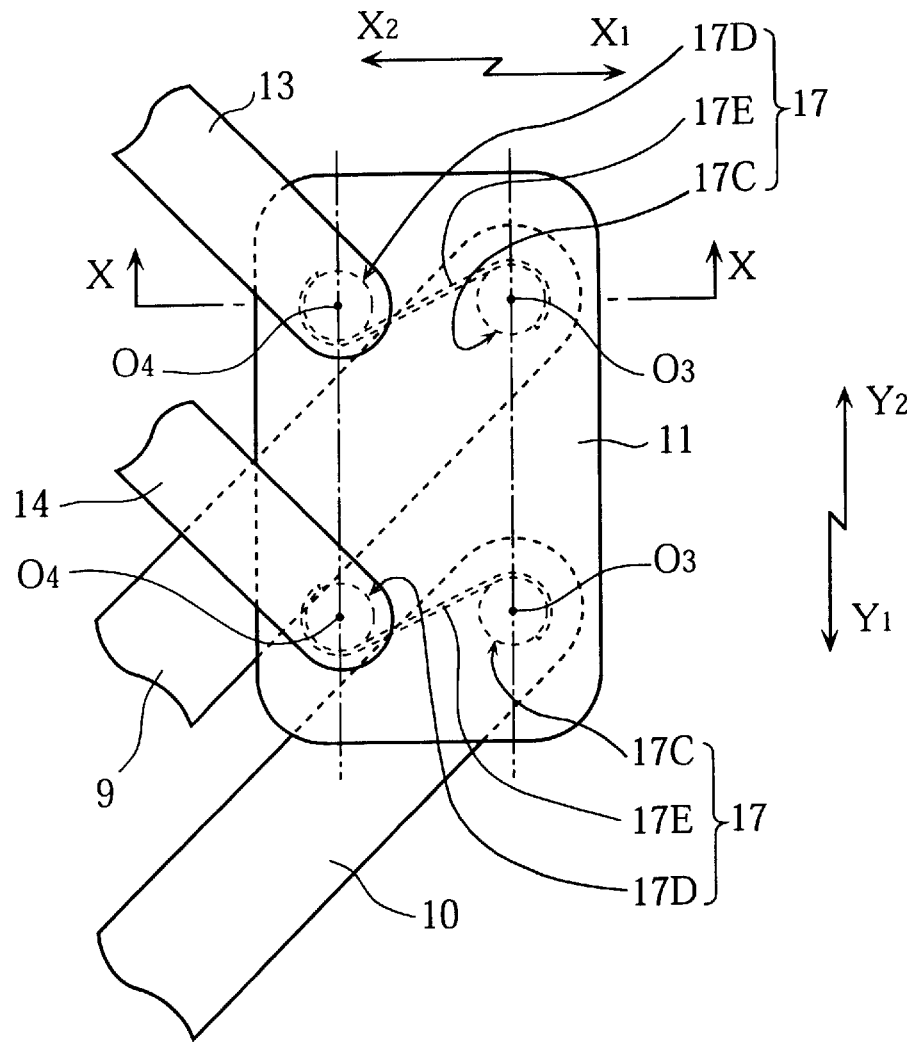
FIG. 9 is a plan view showing principal parts of a modified arm mechanism.
Figure 10:
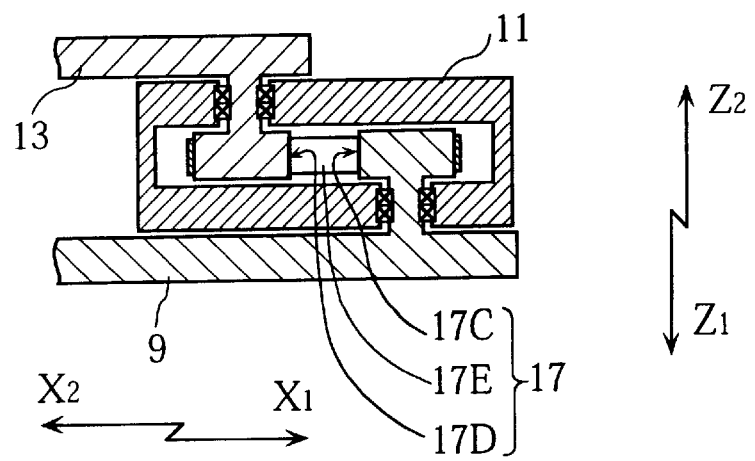
FIG. 10 is a sectional view taken along lines X—X in FIG. 9.

In the above-described embodiment, the rotation-transmitting assembly 17 is made up of the first gear 17A and the second gear 17B which are held in direct contact with each other (FIG. 4). Alternatively, as shown in FIGS. 9 and 10, the rotation-transmitting assembly 17 may include first pulleys 17C, second pulleys 17D and connection belts 17E. The first pulleys 17C are fixed to the first intermediate links 9 and 10, respectively, in a coaxial manner with the third axes O3. Similarly, the second pulleys 17D are fixed to the second intermediate links 13 and 14, respectively, in a coaxial manner with the fourth axes O4. Each of the connection belts 17E is provided for connecting a corresponding pair of the first and the second pulleys 17C, 17D.

Figure 11:
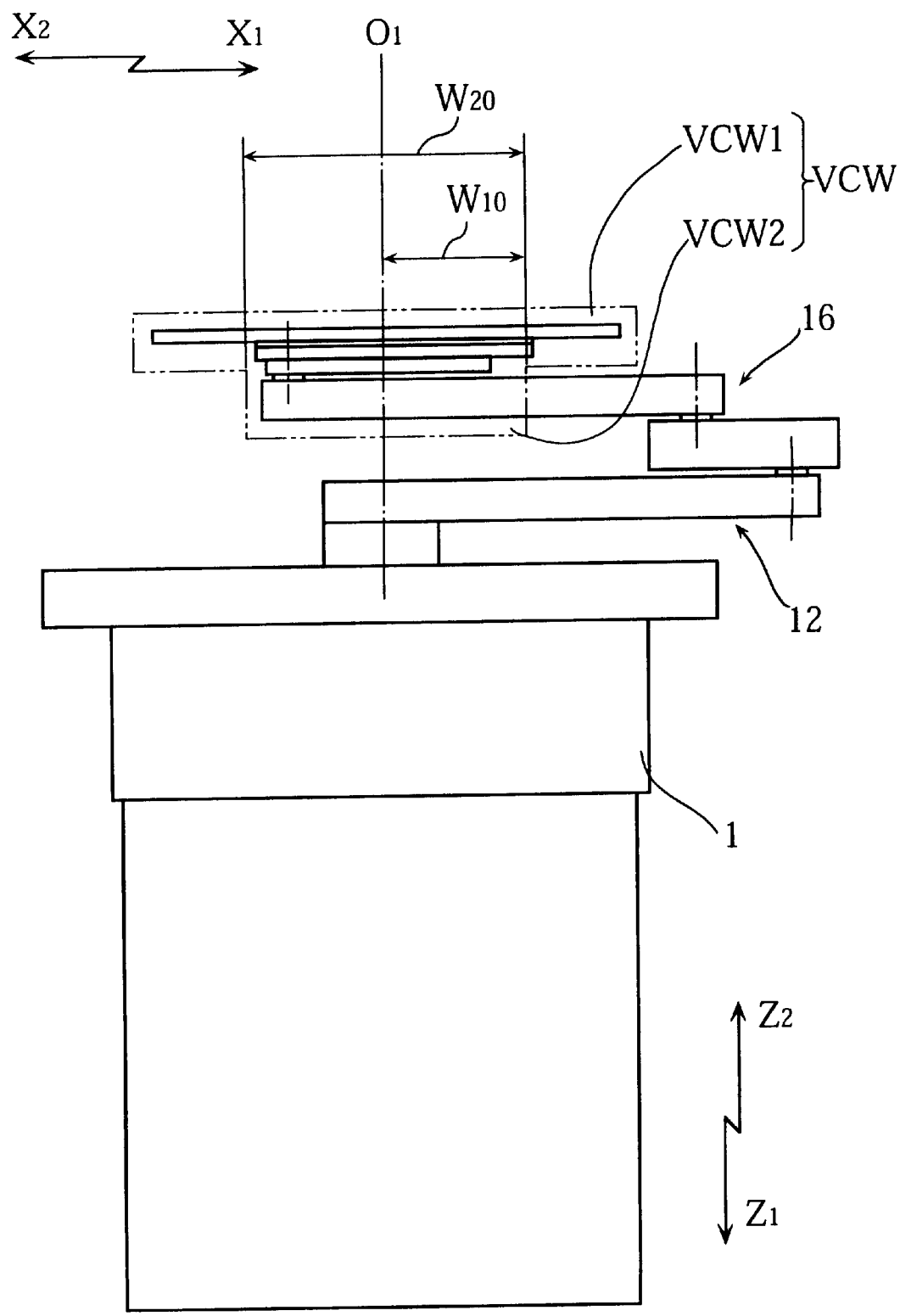
FIG. 11 is a front view showing the transfer robot of the present invention in use.

For allowing the handling member 19A (and the other handling member 19B) to be brought into processing chambers arranged around the transfer robot, each of the chambers is formed with an opening or window VCW, as seen from FIG. 11. For minimizing the sizes of the window VCW without compromising smooth insertion of the handling member 19A, the window VCW includes an upper portion VCW1 and a lower portion VCW2. The lower portion VCW2 communicates with the upper portion VCW1, and has a width W20 which is smaller than that of the upper portion VCW1. The sign W10 refers to a horizontal distance between the right end of the lower portion VCW2 and the first axes O1. (Accurately, the latter should be the O1-O2 line. See FIG. 12).

Figure 12:
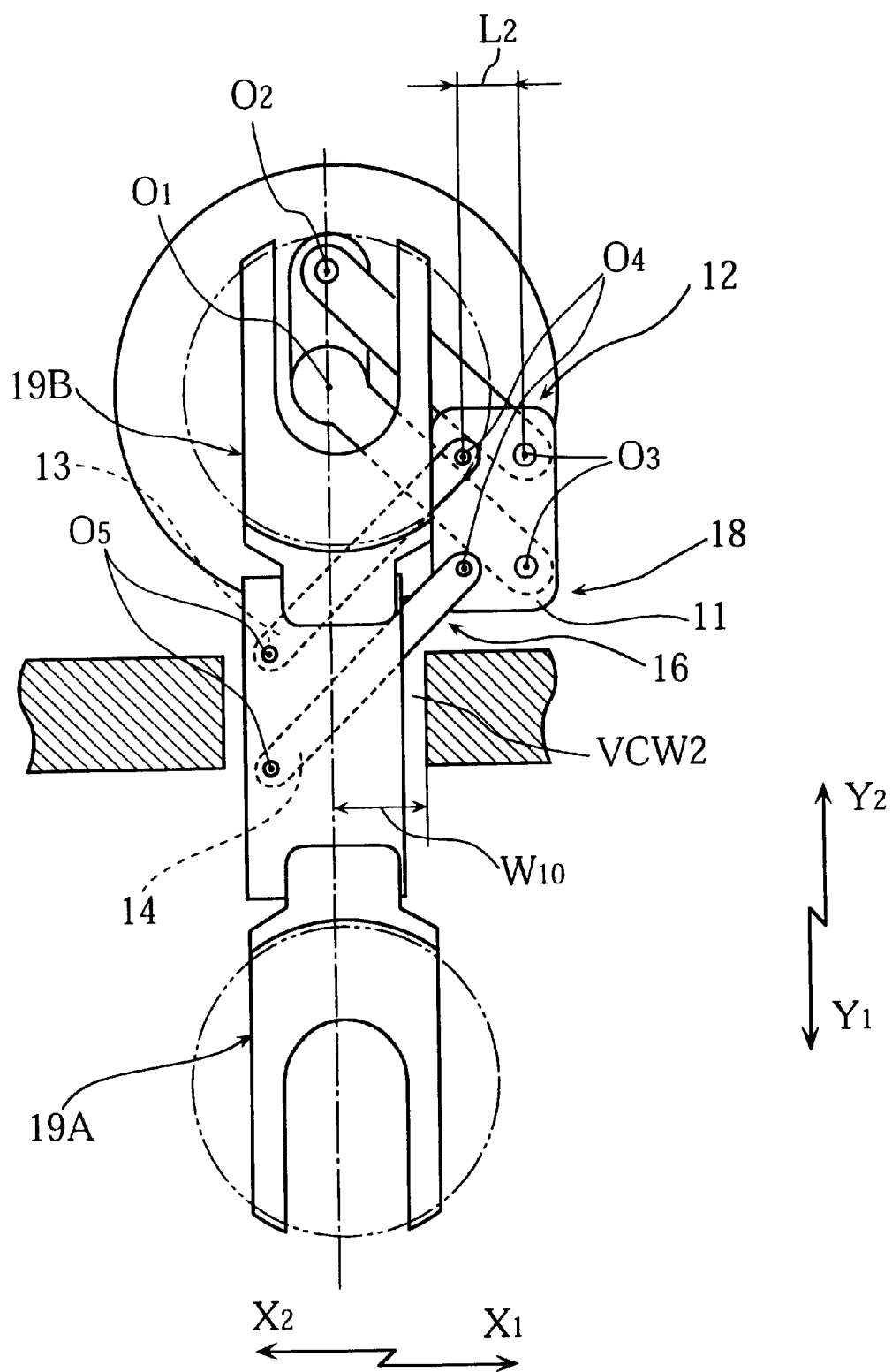
FIG. 12 is a plan view showing the transfer robot of FIG. 11.

As seen from FIG. 11, the upper portion VCW1 is provided for allowing the passage of the workpiece placed on the handling member 19A, while the lower portion VCW2 is provided for avoiding interference with the second pantograph assembly 16 (see also FIG. 12).

For describing the advantages of the present invention, reference will now be made to FIG. 12 and some of the previously mentioned figures.

According to the first embodiment of the present invention, the first and second intermediate links 9–10 and 13–14 have the same length L1 (FIG. 2), as previously described. Further, the fourth axes O4 are spaced from the third axes O3 inwardly (i.e., toward the O1-O2 line). Thus, the second pantograph assembly 16 is offset inwardly from the first pantograph assembly 12, rendering the fifth axes O5 to be spaced from the fourth axes O4 beyond the O1-O2 line. (In FIGS. 2 and 12, the fifth axes O5 are offset from the O1-O2 line in the X2-direction.) In other words, the O1-O2 line intervenes between the fourth axes O4 and the fifth axes O5.

With such an arrangement, even in an instance where the dimension W10 is small, the second intermediate link 14, as being shifted in the Y1-direction, is not interfered with by the wall of a processing chamber (the hatched portion in FIG. 12). Thus, in the transfer robot of the present invention, the handling member 19A is brought into the processing chamber to a predetermined extent, with the dimension W10 (and consequently the width W20) being kept advantageously small.

Figure 13:
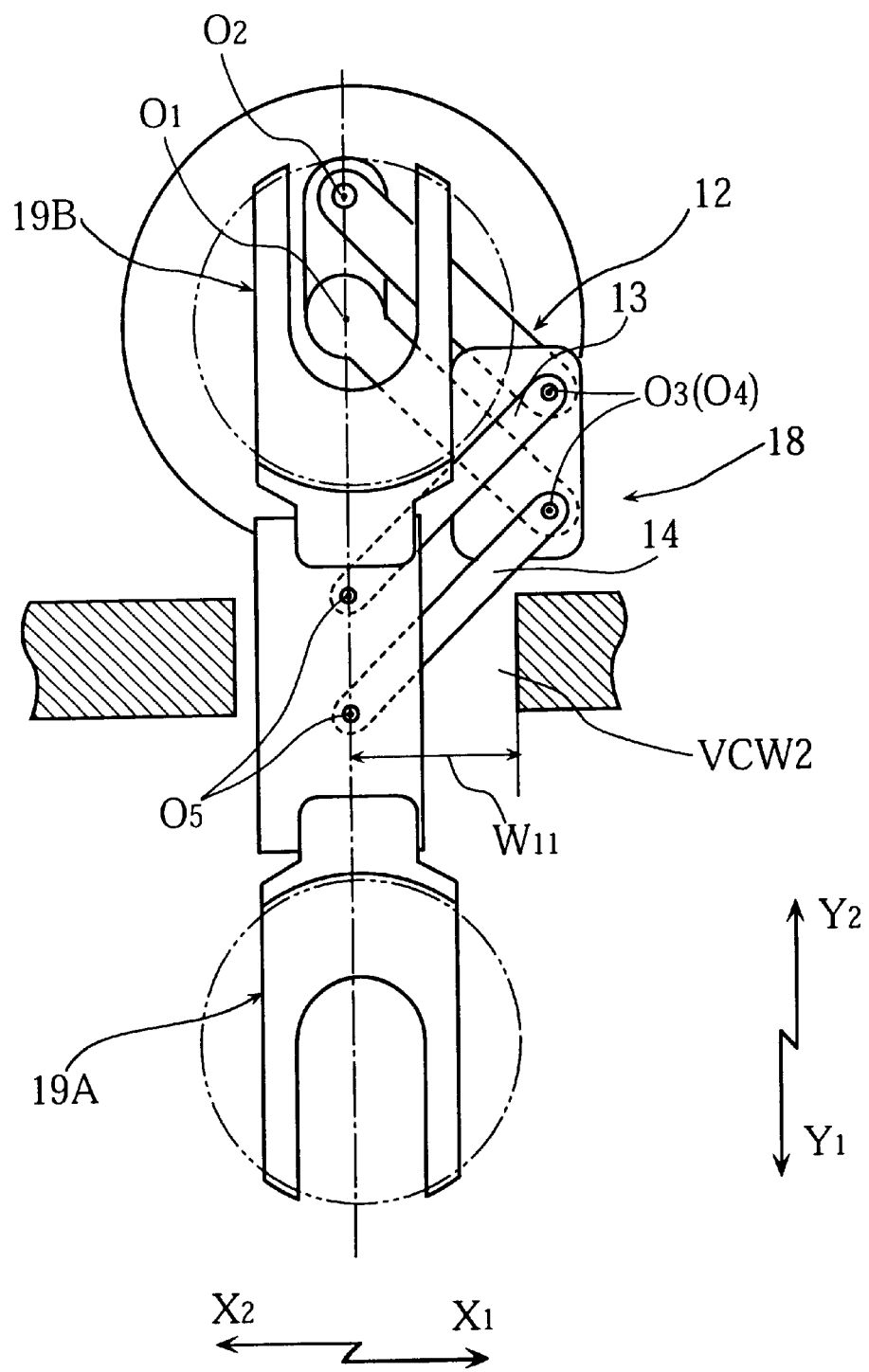
FIG. 13 is a plan view, put for better understanding of FIG. 12, that shows an arrangement of a transfer robot which does not fall in the scope of the present invention.

For better understanding of the present invention, reference will now be made to FIG. 13 showing principal parts of a transfer robot which is not included within the scope of the present invention. In the transfer robot of FIG. 13, as clearly seen, the third axes O3 are not offset from the fourth axes O4 but coincide therewith. Thus, the fifth axes O5 of the second intermediate links are in the O1-O2 line. With such an arrangement, the width W11 between the O1-O2 line and the right end of the lower portion VCW2 should disadvantageously be greater than the width W10 shown in FIG. 12 in order to prevent the second intermediate link 14 from interfering with the wall of the processing chamber.

Though not shown in FIG. 13, the width between the O1-O2 line and the left end of the lower portion VCW2 also needs to be equal to the width W11. Such an arrangement is necessary for properly inserting the other handling member 19B into the processing chamber of FIG. 13 in place of the handling member 19A.

Specifically, the following steps may be performed for inserting the handling member 19B into the processing chamber. First, the currently jutted-out handling member 19A (FIG. 13) is taken out of the processing chamber to be moved back to the initial position. At this stage, the third axes O3 are located on the right side of the O1-O2 line. Then, the double pantograph mechanism 18 is rotated through 180° about the first axes O1 to bring the other handling member 19B into facing relation to the window of the processing chamber. At this stage, the third axes O3 are located on the left side of the O1-O2 line. Finally, the double pantograph mechanism 18 is actuated to shift the other handling member 19B into the processing chamber.

During the above final step, if the distance between the O1-O2 line and the left end of the lower portion VCW2 is smaller than the width W11, the advance of the second intermediate link 13 will be blocked before the handling member 19B is inserted into the processing chamber to the predetermined extent. To eliminate this problem, the entire width of the lower portion VCW2 needs to be equal to or even greater than 2×W11.

Referring to FIG. 4, the transfer robot according to the first embodiment of the present invention also has the following advantage.

Figure 15:
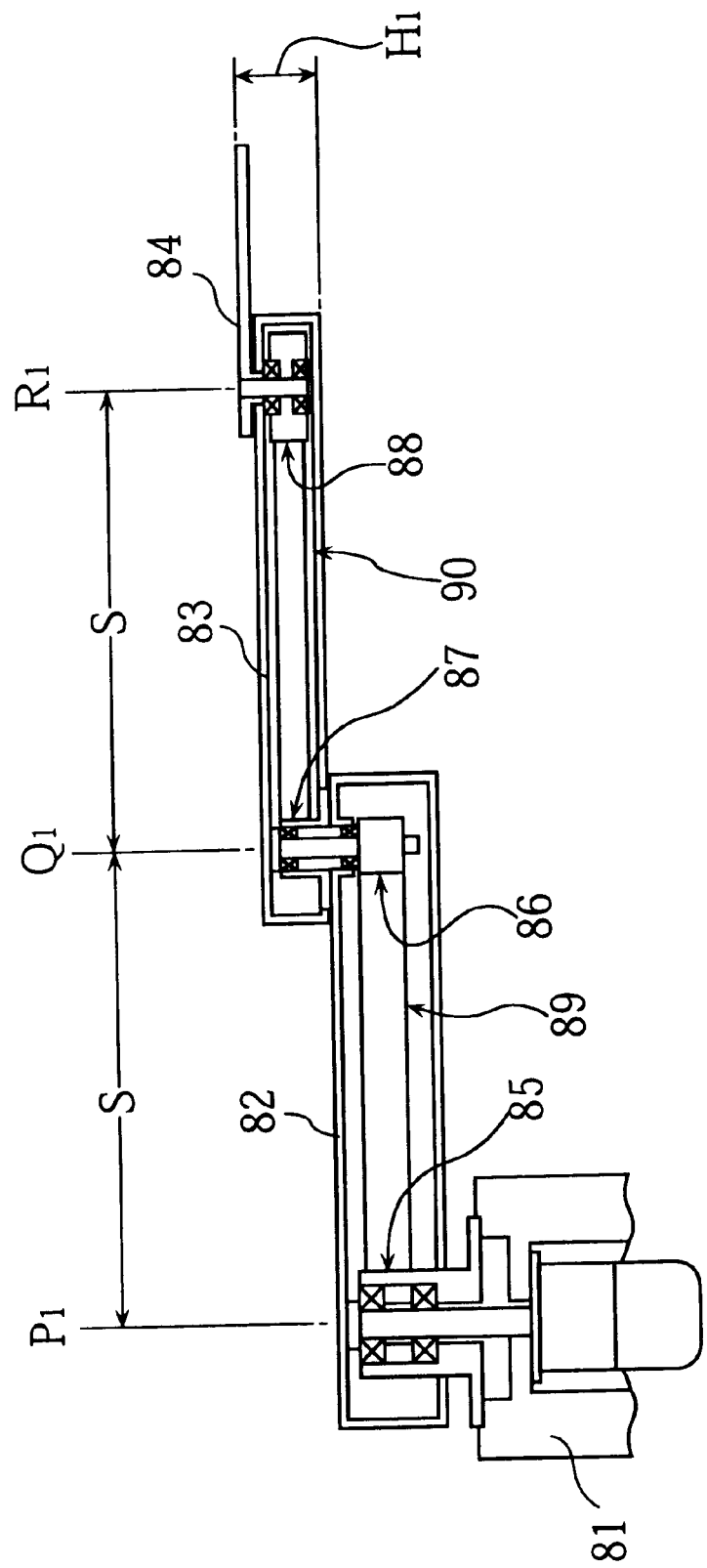
FIG. 15 is a sectional view showing an arm mechanism of a conventional transfer robot.
Figure 16:
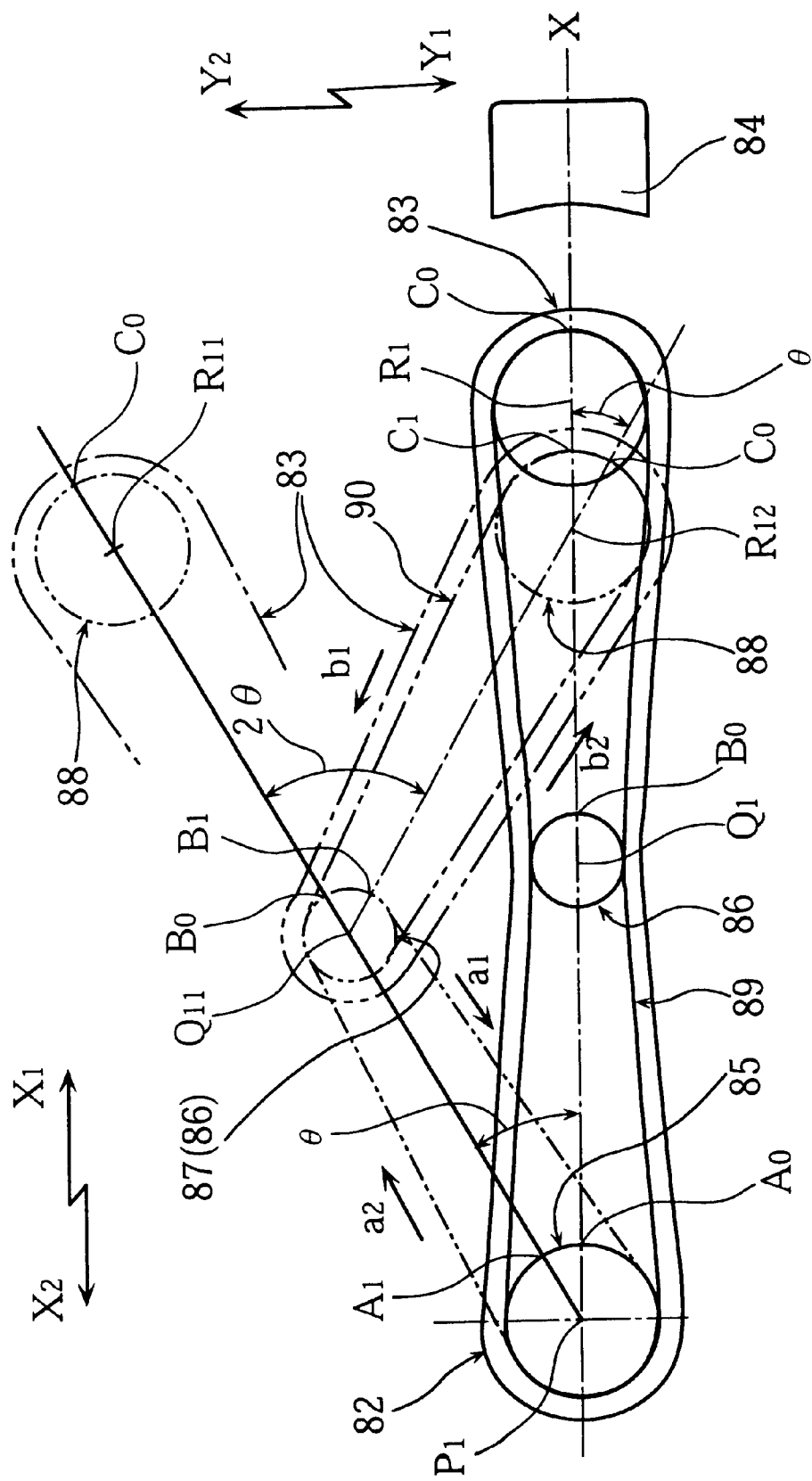
FIG. 16 is a plan view illustrating how the arm mechanism of the conventional transfer robot operates.
Figure 17:
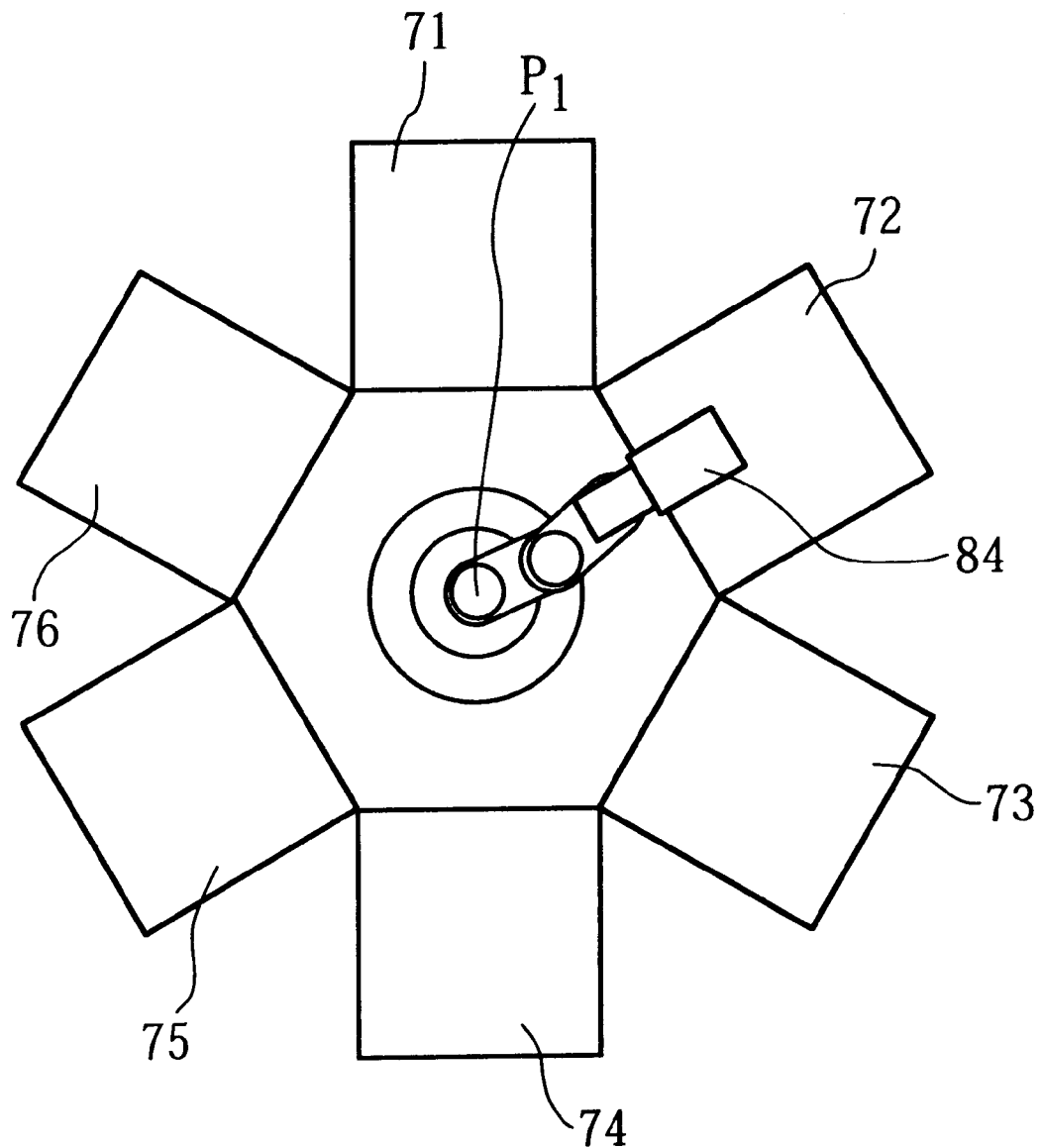
FIG. 17 is a plan view showing the conventional transfer robot around which several processing chambers are provided.

Conventionally, as shown in FIG. 15, use is made of rotation-transmitting members 87, 88 and a connecting member 90 which tend to bulge. According to the present invention, however, such unduly bulging members are not used, but a link mechanism is adopted. Thus, the height H2 (FIG. 4) is made smaller than the height H1 (FIG. 15), which is advantageous in reducing the height of the window VCW (FIG. 11).

As seen from the above explanation, the present invention makes it possible to reduce the dimensions of the window of the processing chamber. Thus, vacuum condition in the processing chamber can be readily created and/or maintained.

Further, according to the first embodiment, the first and the second shafts 2, 3 are supported coaxially. Thus, the bearings supporting these shafts and the magnetic fluid seals 5, 4 can be made small in diameter. This means that the transfer robot of the present invention can be compact and inexpensive.

Still further, according to the first embodiment, the first and the second driving devices 6, 7 are fixed to the stationary base member 1. Thus, the power supply cable for supplying the driving devices with electricity does not break due to the rotation of the arm mechanism. Such an arrangement makes it possible for the handling members 19A, 19B to rotate around the first axis O1 through any desired angle. Thus, the transfer robot of the present invention is more conveniently used than the conventional transfer robot. In addition, the transfer robot of the present invention is made inexpensive since there is no need to use additional devices for monitoring the rotation angle of the handling members.

Figure 14A:
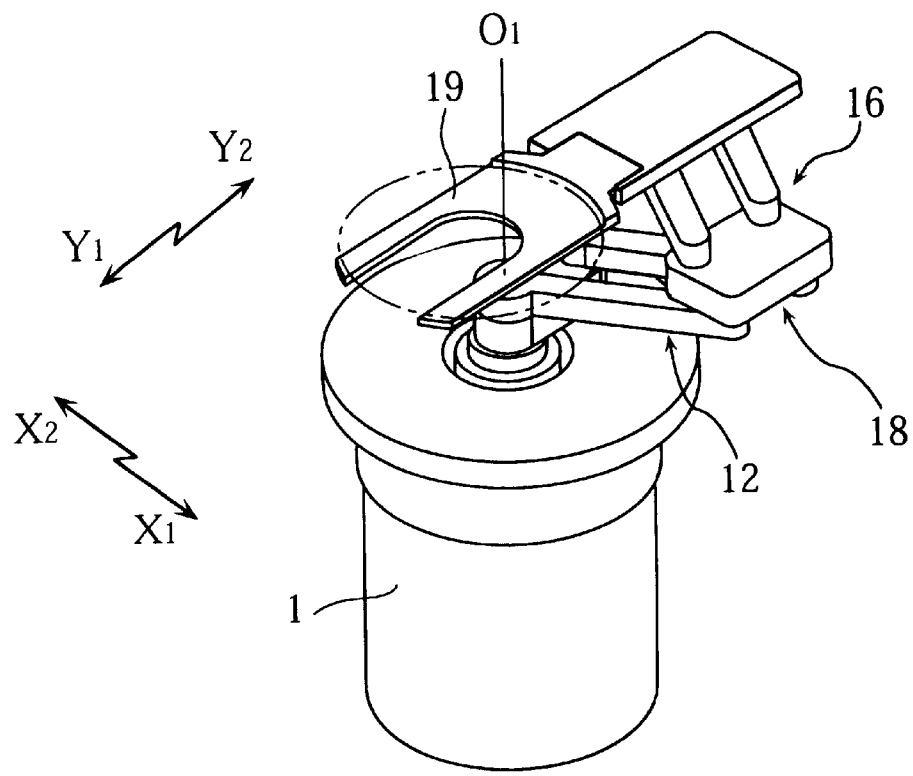
FIGS. 14A and 14B are perspective views showing a transfer robot according to a second embodiment of the present invention.
Figure 14B:
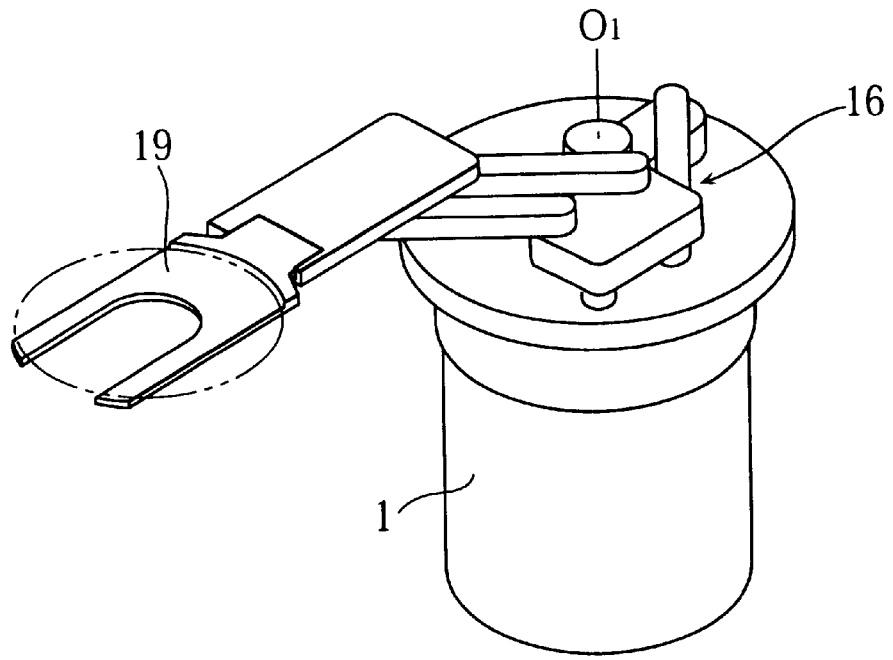

FIGS. 14A and 14B show a transfer robot according to a second embodiment of the present invention. The basic arrangements of the second embodiment are similar to those of the first embodiment, thereby requiring no separate description. The only difference is that the transfer robot of the second embodiment utilizes a single handling member 19.

The preferred embodiments of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A transfer robot comprising:

a double pantograph mechanism including a first pantograph assembly and a second pantograph assembly, the first pantograph assembly being made up of a base link, an outer link and a pair of first intermediate links connecting the base link to the outer link, the second pantograph assembly being made up of the outer link, an inner link and a pair of second intermediate links connecting the outer link to the inner link, each of the first and the second intermediate links being identical in length;

a first handling member for holding a workpiece, the first handling member being supported by the inner link;

a rotation-transmitting mechanism for associating the first pantograph assembly with the second pantograph assembly;

a stationary base member;

a first shaft and a second shaft which are rotatable about a vertical axis, each of the first and second shafts being coaxially supported by the base member; and a first driving device and a second driving device associated with the first shaft and the second shaft, respectively, each of the first and the second driving devices being attached to the base member, wherein one of the first intermediate links is attached to the first shaft, and the base link is attached to the second shaft;

the second pantograph assembly being offset toward the vertical axis relative to the first pantograph assembly such that each of the first intermediate links is pivotally connected to the outer link at a position farther from the vertical axis, and each of the second intermediate links is pivotally connected to the outer link at a position closer to the vertical axis;

the first handling member being arranged not only to linearly move in horizontal straight lines passing through the vertical axis but to move around the vertical axis.

2. The transfer robot according to claim 1, further comprising an additional handling member supported by the inner link, the first handling member and the additional handling member being arranged to project from the inner link in opposite directions.

3. The transfer robot according to claim 1, wherein each of the first and the second shafts is rotatably supported via a magnetic fluid seal for hermetic sealing.

* * * * *